Figure 1:
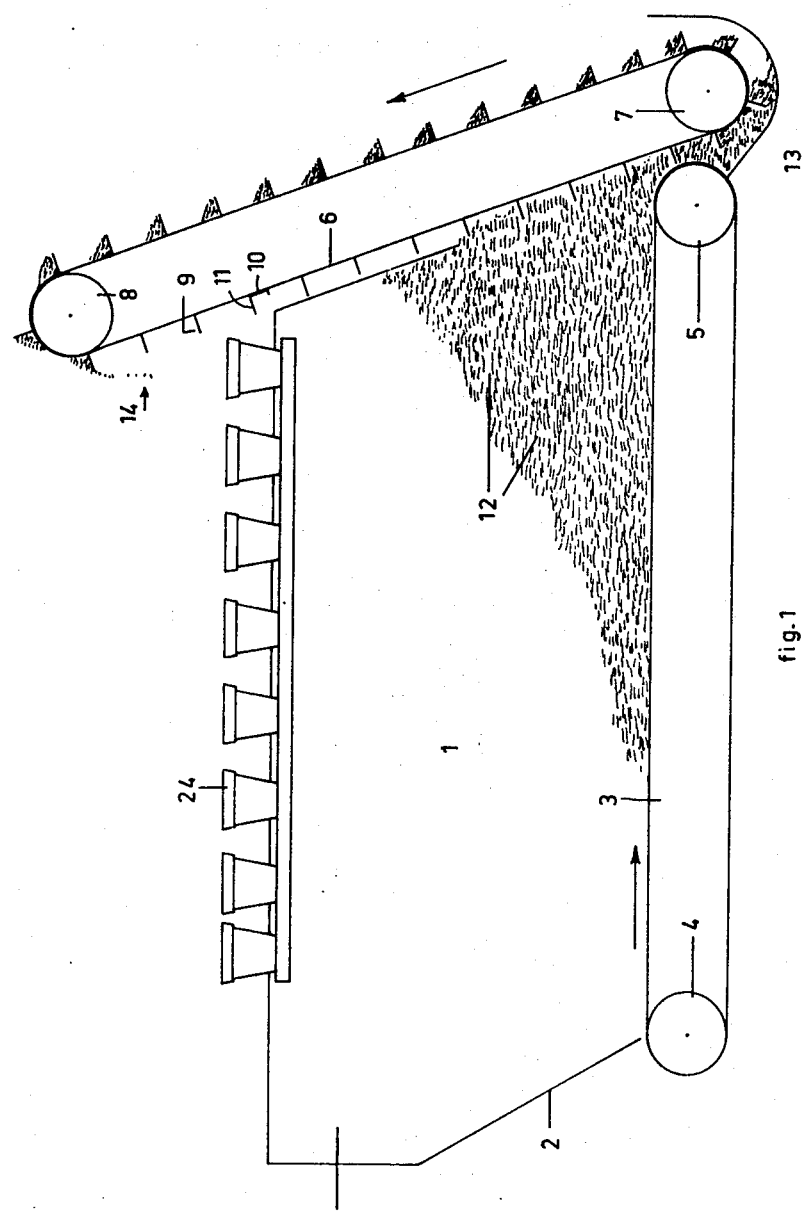

United States Patent
van Nobelen

[11] 3,713,465
[45] Jan. 30, 1973

[54] DEVICE FOR FILLING FLOWER POTS WITH EARTH

[76] Inventor: Arnoldus Hendricus van Nobelen, 59 Kerkstraat, Noordwijkerhout, Netherlands

[22] Filed: Feb. 16, 1971

[21] Appl. No.: 115,425

[30] Foreign Application Priority Data

Feb. 16, 1970 Netherlands ..................7002169

[52] U.S. Cl. .....................141/134, 198/57, 198/102
[51] Int. Cl. ...........................................B65b 43/52
[58] Field of Search..................141/131–134, 125; 198/56, 57, 102; 214/46, 519, 520, 521, 522; 241/100, 101, 186; 222/227, 252, 254, 415

[56] References Cited

UNITED STATES PATENTS

| | | | |
|---|---|---|---|
| 3,523,562 | 8/1970 | Haupricht | 141/134 |
| 3,298,404 | 1/1967 | Eisenberg | 141/1 |
| 3,517,708 | 6/1970 | Eisenberg | 141/1 |

*Primary Examiner*—Houston S. Bell, Jr.
*Attorney*—Stevens, Davis, Miller & Mosher

[57] ABSTRACT

A device for filling pots such as flower pots with earth or the like, said device having a vessel for receiving an earth supply, a conveyor for moving a number of pots towards and from the location where the filling occurs and means for raising the earth from the vessel to above the plane of the pot-conveyor, in which an upright side of the supply vessel is formed by a side of a vertically extending endless conveyor enclosing an acute angle with respect to the bottom plane of the vessel. The vertically extending conveyor has step means capable of receiving earth from the vessel. The bottom of the vessel is the upper side of a belt conveyor and a channel is provided at the point where the conveyors meet. The step means of the upright conveyor are capable of moving along the wall of the channel. The conveyor forming the top of the supply-vessel consists of a number of chains or the like and between the chains are right angle shaped plate strips, one leg of each strip being parallel to the conveyor, the other leg perpendicular thereto. The conveyor for the pots consists of an endless chain led over rollers, said chain being formed with dogs and of a guiding path within the reach of the dogs, the distance between two successive dogs being smaller than the width of the conveying elements on the upright conveyor.

3 Claims, 2 Drawing Figures

DEVICE FOR FILLING FLOWER POTS WITH EARTH

This invention relates to a device for filling pots such as flower pots with earth or the like, said device consisting essentially of a vessel for receiving an earth supply, a conveyor for moving a number of pots towards and from the location where the filling occurs and means for raising the earth from the vessel to above the plane of the pot-conveyor.

Similar devices are known and combined with means serving for making a hole in a filled pot, said hole being adapted to receive in it a young plant with roots and surrounding earth.

The present invention has for its object an improvement of the known device in that the production can be increased, the device is easily operated and loss of earth is reduced to a minimum.

These and other objects are achieved by a device in which an upright side of the supply vessel is formed by a side of an upright endless conveyor enclosing an acute angle with respect to the bottom plane of the vessel, said conveyor being formed with cross elements or step across the conveyor means capable of receiving earth from the vessel. The bottom of the vessel is the upper side of a belt conveyor and a channel is provided at the point where two conveyors meet. The cross-elements of the upright conveyor are capable of moving along the wall of the channel.

When the device is in operation the earth present in the vessel is continuously moved towards the upright conveyor, said conveyor while moving the earth downwards conveys it from the vessel, with the earth lying on the outside of the conveyor being moved upwards and being discharged from above into a number of juxtaposed flower-pots or the like. Now the excess of earth automatically falls back into the supply-vessel, which means that there is no loss of earth and the direct surrounding area of the device does not need frequent cleaning.

Preferably the conveyor forming the bottom wall of the supply-vessel consists of a number of chains or the like led over rollers with plate strips between the chains forming a substantially right angle, one leg of each strip being parallel to the conveyor, the other leg positioned perpendicular thereto.

In a preferred embodiment the conveyor for the pots or the like consists of an endless chain led over rollers, said chain having dogs, and a guiding path within the reach of the dogs, the distance between two successive dogs being smaller than the width of the conveying elements on the upright conveyor. This means that a number of pots can simultaneously be filled with earth, the excess of earth being returned into the vessel in that the pot-conveyor is above the vessel, at least as far as the portion where the filling takes place is concerned.

Figure 2:
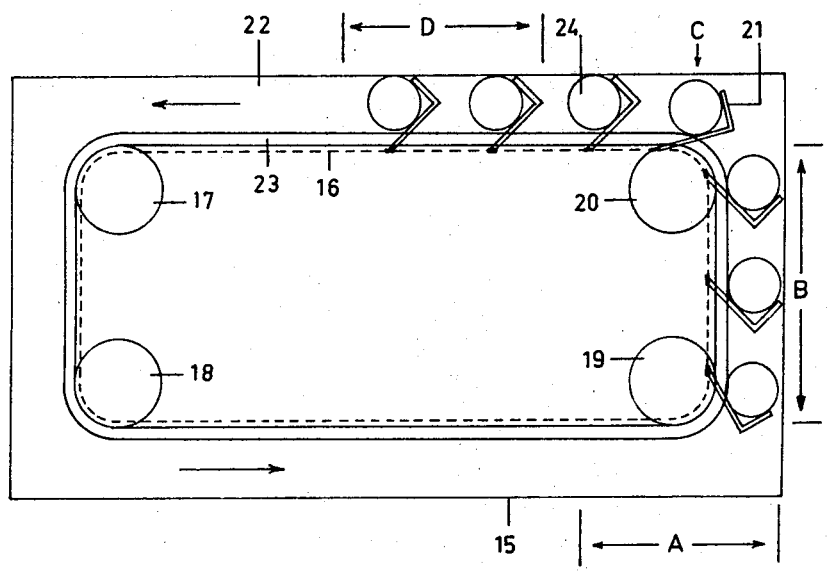

A preferred embodiment is shown in the attached drawings in which:

FIG. 1 is a side view of the invention;
FIG. 2 a top view of the pot conveyor.

In the drawing one of the upright side walls of the supply-vessel of the device is represented by 1 and the rear wall by 2, the height of the latter being limited. In this way an aperture is formed through which - as indicated by an arrow - earth can be discharged into the vessel.

The bottom of the vessel is formed by the upper side 3 of an endless conveyor which is led over the drums 4 and 5. The driving direction of the belt conveyor is indicated by an arrow. Furthermore the vessel may be provided with wheels so that the whole assembly can be easily moved.

The front wall of the vessel is formed by the side 6 of an endless conveyor consisting of a number of chains, the latter being led around chain wheels 7 and 8, cross elements or step means 9 being fixed between said chains. These cross elements may consist of angular plates, one leg 10 of which is parallel to the plane of the conveyor, the other leg 11 being positioned perpendicular thereto. The movement of the conveyor is indicated by an arrow. When both the conveyor 3 forming the bottom of the vessel and the conveyor forming an upright wall are in operation, the earth 12 present in the vessel will be conveyed in a horizontal direction and subsequently downwards discharged by the conveyor elements 9. There is a channel 13 under the upright conveyor, the conveyor elements 9 being capable of moving along the walls of the channel. The earth is conveyed in an upward direction at the outside of the conveyor, is tumbled over the wheel 8 and then falls back into the vessel at 14 in case no pots or the like are present in the path of the falling earth.

There is a pot-conveyor provided in the upper face of the vessel, which is generally indicated by 15 in FIG. 2, said pot-conveyor being formed by an endless chain 16 which is led over reversing wheels 17, 18, 19 and 20, and to which dogs 21 are fixed. Furthermore a guiding path 22 is provided with an upright side 23 along which the pots 24 are capable of being moved.

The device as drawn and described hereinbefore can be combined with a motor driven drill, serving for removing a certain quantity of earth from the pot so that a young plant with earth surrounding its roots may be planted into the formed hole.

Since the pot is not allowed to move as the earth is removed from it the drive of the pot-conveyor 16 is intermittently designed. Furthermore provisions are made for changing the stroke so that the device may be universally adjusted for practically any pot dimension.

In operation the pot conveyor moves intermittently in the direction of the arrows shown in the drawing. It should be observed that in FIG. 2 only a representative number of dogs 21 are shown whereas in fact the chain conveyor 16 is provided with dogs over its entire length. The mutual distance between successive dogs 21 may be adjustable, dependent on the size of the pot to be filled.

Empty pots may be supplied automatically or otherwise and placed on the guide 22 at the point indicated by A. The filling of the pots with earth is accomplished over the portion B.

The drilling of a hole occurs at the point indicated by C. For that purpose a drill rod provided with a drill is movable in a vertical sense, the rod being preferably driven by an electric motor. Planting vegetation into a pot occurs along the portion D, whereas at any point between portion D and portion A the pots filled with earth and provided with vegetation can be removed.

For the purpose of matching the supplied quantity of earth with the size of the pot, it is possible to accelerate or reduce the speeds of the conveyors constituting the bottom and the upright wall.

I claim:

1. A device for filling pots with a particulate material comprising:
- a material supply means having a first horizontally extending conveyor to move said material to a receiving means at the end of said first conveyor;
- an upright conveyor inclined at an acute angle to said first conveyor having step means to remove material from said receiving means and carry it upward and above said first conveyor;
- a second horizontally extending conveyor positioned above said first conveyor and below the distal end of the upright conveyor to move pots into the path of material falling from the end of the upright conveyor, said end being positioned so that any excess material falls back into the material supply means.

2. The device of claim 1 in which said first conveyor has at least two chains with right angle section cross members between the chains, one leg of said member being parallel to the conveyor and the other leg being perpendicular thereto.

3. The device of claim 1 in which said second conveyor has an endless chain with dogs extending therefrom into the path of travel for said pots, the distance between two successive dogs being smaller than the width of the step means on the upright conveyor.

* * * * *

Disclaimer and Dedication

3,713,465.—*Arnoldus Hendricus van Nobelen*, Noordwijkerhout, Netherlands. DEVICE FOR FILLING FLOWER POTS WITH EARTH. Patent dated Jan. 30, 1973. Disclaimer and dedication filed Dec. 23, 1977, by the inventor.

Hereby disclaims and dedicates to the Public the remaining term of said patent.

[*Official Gazette March 21, 1978.*]